US012455101B2

(12) United States Patent
Westhaeuser et al.

(10) Patent No.: US 12,455,101 B2
(45) Date of Patent: Oct. 28, 2025

(54) METHOD FOR OPERATING A HEAT PUMP FOR A MOTOR VEHICLE AND HEAT PUMP

(71) Applicant: Volkswagen Aktiengesellschaft, Wolfsburg (DE)

(72) Inventors: Jochen Westhaeuser, Braunschweig (DE); Sven Twenhoevel, Sassenburg (DE); Peter Hellmann, Cremlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/978,773

(22) Filed: Nov. 1, 2022

(65) Prior Publication Data

US 2023/0138734 A1    May 4, 2023

(30) Foreign Application Priority Data

Nov. 2, 2021    (DE) ..................... 10 2021 212 314.7

(51) Int. Cl.
*F25B 47/02*    (2006.01)
*B60H 1/00*    (2006.01)
(Continued)

(52) U.S. Cl.
CPC ....... *F25B 47/025* (2013.01); *B60H 1/00878* (2013.01); *F25B 13/00* (2013.01);
(Continued)

(58) Field of Classification Search
CPC ........ F25B 47/025; F25B 13/00; F25B 30/02; F25B 2700/1933; B60H 1/00878; B60H 2001/00949
See application file for complete search history.

(56) References Cited

U.S. PATENT DOCUMENTS 5,038,575 A * 8/1991 Yamada ................ F25D 21/008
62/155
10,160,291 B2    12/2018 Miyakoshi et al.
(Continued)

FOREIGN PATENT DOCUMENTS

CN    105034748 B    11/2017
CN    108482062 A    9/2018
(Continued)

OTHER PUBLICATIONS

Li Su, Comprehensive Intelligent Refrigeration House Defrosting Device, Dec. 31, 2019, CN110631319A, Whole Document (Year: 2019).*

(Continued)

*Primary Examiner* — Larry L Furdge
(74) *Attorney, Agent, or Firm* — Muncy, Geissler, Olds & Lowe, P.C.

(57) ABSTRACT

A heat pump for a motor vehicle includes a refrigerant circuit with a refrigerant, an ambient heat exchanger, a compressor, a heating heat exchanger, and a throttle. A method for operating the heat pump includes determining an expected start time of a charging process of a motor vehicle battery and determining a maximum dew point undershoot and/or a maximum frost mass and operating the heat pump such that the maximum dew point undershoot and/or the maximum frost mass are reached within a predefined time period before the expected start time.

16 Claims, 2 Drawing Sheets

(51) Int. Cl.
  *F25B 13/00* (2006.01)
  *F25B 30/02* (2006.01)
(52) U.S. Cl.
  CPC .... *F25B 30/02* (2013.01); *B60H 2001/00949* (2013.01); *F25B 2700/1933* (2013.01)

(56) References Cited

U.S. PATENT DOCUMENTS

| | | | |
|---|---|---|---|
| 10,189,332 B2 | 1/2019 | Miyakoshi et al. | |
| 2012/0266621 A1* | 10/2012 | Yokohara | F25B 47/022 |
| | | | 62/155 |
| 2013/0167786 A1* | 7/2013 | Mehring | F01P 3/02 |
| | | | 123/41.82 R |
| 2013/0257387 A1* | 10/2013 | Yokoyama | H02J 7/04 |
| | | | 320/137 |
| 2014/0041404 A1* | 2/2014 | Tsunoda | B60H 1/321 |
| | | | 62/156 |
| 2015/0121930 A1* | 5/2015 | Kasuya | F25D 21/08 |
| | | | 165/63 |
| 2015/0283978 A1* | 10/2015 | Miyakoshi | B60H 1/00978 |
| | | | 62/140 |
| 2015/0361864 A1* | 12/2015 | Wagner | F01P 7/08 |
| | | | 165/300 |
| 2018/0209123 A1* | 7/2018 | Bahrami | B01D 5/006 |
| 2018/0334014 A1* | 11/2018 | Nakasako | B60L 1/04 |
| 2021/0053550 A1 | 2/2021 | Kim et al. | |

FOREIGN PATENT DOCUMENTS

| | | |
|---|---|---|
| CN | 110631319 A * | 12/2019 |
| JP | H07117459 A | 5/1995 |
| JP | 2012176660 A * | 9/2012 |
| JP | 2016049914 A | 4/2016 |
| JP | 2021037888 A | 3/2021 |

OTHER PUBLICATIONS

Miyakoshi et al., Air Conditioning Device for Vehicle, Sep. 13, 2012, JP2012176660A, Whole Document (Year: 2012).*
Hirakawa et al., Vehicle Ventilation System and its Control Method, Sep. 27, 1994, JPH06270803A, Whole Document (Year: 1994).*
Yuanjie et al., Method for Controlling Defrosting of Air Conditioner of Heat Pump . . . , Oct. 13, 2017, CN107244212A, Whole Document (Year: 2017).*

* cited by examiner

METHOD FOR OPERATING A HEAT PUMP FOR A MOTOR VEHICLE AND HEAT PUMP

This nonprovisional application claims priority under 35 U.S.C. § 119(a) to German Patent Application No. 10 2021 212 314.7, which was filed in Germany on Nov. 2, 2021, and which is herein incorporated by reference.

BACKGROUND OF THE INVENTION

Field of the Invention

The present invention relates to a method for operating a heat pump for a motor vehicle and to a heat pump for a motor vehicle.

Description of the Background Art

The use of heat pumps to heat the interior of a motor vehicle, especially in electromobility, is generally known from the state of the art. The heat required for heating is typically taken from the ambient air of the motor vehicle, in other words, from the outside air, wherein an ambient heat exchanger of the heat pump must be cooled below the ambient temperature for this purpose. However, if the ambient air falls below its dew point, frost or ice forms on the surface of the ambient heat exchanger, as a result of which air is prevented from flowing through it and the heat pump can no longer be operated efficiently.

Thus, defrost cycles are necessary, the aim of which is to melt the frost or ice and thus to ensure flow through the heat exchanger. For particularly efficient operation of the heat pump, the defrosting processes should take place as efficiently as possible.

SUMMARY OF THE INVENTION

It is therefore an object of the present invention to provide a method for operating a heat pump for a motor vehicle and to improve a heat pump such that the efficiency of the heat pump is increased.

The aforementioned object is achieved by a method for operating a heat pump for a motor vehicle, for example, an electric vehicle or a hybrid electric motor vehicle, wherein the heat pump comprises a refrigerant circuit with a refrigerant. The heat pump further comprises an ambient heat exchanger, a compressor, a heating heat exchanger, and a throttle. These are integrated into the refrigerant circuit. The method comprises determining an expected start time of a charging process of a motor vehicle battery, wherein the method further comprises determining a maximum dew point undershoot and/or a maximum frost mass. The maximum frost mass describes a maximum mass of frost or ice that the ambient heat exchanger can take up. This can occur at the maximum temperature undershoot. The heat pump is then operated in such a way that the maximum dew point undershoot and/or the maximum frost mass are reached within a predefined time period before the determined start time.

Further, the method preferably comprises initiating a defrosting process upon reaching the maximum dew point undershoot and/or upon reaching the maximum frost mass and/or upon initiating a battery charging process. The maximum frost mass is reached when the maximum frost mass has formed on the ambient heat exchanger. The maximum temperature undershoot refers to the temperature of the refrigerant in the ambient heat exchanger.

Because a defrosting process cannot always take place while the motor vehicle is being driven, defrosting is thus preferably shifted to a time when the car is stationary because it is being charged. Due to the defrosting during the charging process, the advantage arises that the start time of the charging process can be estimated very well and thus the heat pump can be operated optimally beforehand in the heating or icing mode. Thus, a selective frosting over of the ambient heat exchanger of the heat pump is allowed and the defrosting is initiated at a known point in time, which can be easily estimated, when the motor vehicle is not operated but is charged.

When charging the vehicle at ambient temperatures below 0° C., it is advantageous if defrosting continues beyond the time when the ambient heat exchanger is free of frost and ice, preferably for at least 10 minutes. In particular, the defrosting process should be extended until the surface temperature of the heat exchanger is above 0° C. to ensure that the water drains during the charging period. As a result, the mass of melted water can be reduced by refreezing on the heat exchanger surface and the subsequent heating process of the heat pump can be extended.

The heat pump operation is thus carried out extremely efficiently by means of the present method, because the ambient heat exchanger blocks as shortly before the start time of the charging process as possible or the heat absorption of the ambient heat exchanger from the ambient air decreases significantly. As a result, the maximum possible heat can be absorbed from the environment during the heating mode.

A minimum suction pressure of the refrigerant in the refrigerant circuit can be determined on the basis of the maximum dew point undershoot and/or the maximum frost mass, because the suction pressure correlates directly with the temperature in the ambient heat exchanger. Because the refrigerant can also be overheated locally, a determination of the suction pressure is particularly advantageous. The suction pressure and the dew point undershoot or the frost mass serve as a measure for the icing of the ambient heat exchanger. If the suction pressure falls below the previously determined minimum suction pressure, which serves as a limit value, this is an indication of maximum icing, i.e., of reaching the maximum dew point undershoot and/or the maximum frost mass. The method can comprise measuring the suction pressure using a pressure sensor. Further, the method can comprise monitoring the suction pressure.

The heat pump is operated in such a way that by means of a control, primarily the regulation of the compressor and/or the throttle, it is achieved that the maximum dew point undershoot and/or the maximum frost mass are reached within a predefined period of time before the expected start time. This is achieved in the heating mode of the heat pump. Preferably, a reduction of the heat output to be generated via the heat pump can take place. Missing heat output of the heat pump can be generated by an additional heat source, for example, an electric heater, so that there is no disadvantage for the occupants of the vehicle. For example, a relation between the heat output to be provided by the heat pump and the heat output to be provided by another heat source can be determined. For example, the heat pump could cover ⅔ of the required heat output within the predefined time period until the charging time, whereas the rest is provided by an additional heat source. Further, an additional heat source of the heat pump can be used which raises the suction pressure to the required level until the heat exchanger reaches the calculated maximum frost mass at the expected start time of the charging process.

The predefined time period can be, for example, half an hour, preferably a quarter of an hour. For example, a degree of icing can be monitored by means of the suction pressure. It is possible to estimate based on a change in the degree of icing over time when the maximum degree of icing and/or preferably the maximum dew point undershoot will occur. If this point in time is, for example, after the expected start time of the next charging process, it can be achieved by means of controlling or regulating the compressor and/or the throttle that the ambient heat exchanger ices up more quickly and the point in time of the maximum dew point undershoot can thus be brought forward. In particular, the throttle regulates the efficiency of the icing process.

The start of the defrosting process can take place in particular as soon as the heat transfer efficiency is greatly reduced, because then hardly any efficient heat absorption from the environment is possible. By way of example, the defrosting process can be initiated when a degree of icing of the ambient heat exchanger has exceeded a certain threshold, in particular when the maximum frost mass is present, wherein this can be determined by calculation or by means of a sensor.

In the ambient heat exchanger, heat is transferred between the refrigerant and the environment, i.e., the ambient air, whereas in the heating heat exchanger, heat is transferred between the refrigerant and the air of an interior of the motor vehicle. During a heating operation, the ambient heat exchanger serves as an evaporator and the heating heat exchanger as a condenser. During the defrosting process, in other words, during the defrost mode, the "path" of the refrigerant is reversed compared to the heating process in particular. Whereas in the heating mode the ambient heat exchanger serves as an evaporator, in defrost mode it serves as a condenser. The same applies to the heating heat exchanger, which acts as an evaporator in the defrost mode and as a condenser in the heating mode.

The defrosting process thus comprises, in particular, compressing the refrigerant to a high pressure by means of the compressor, transferring heat from the refrigerant to the ambient heat exchanger, in particular, one that is frosted or iced over, expanding the refrigerant to a low pressure by means of the throttle, and absorbing heat again. Specifically, the refrigerant continues to heat up during compression, wherein it is then fed to the ambient heat exchanger, to which it gives off heat. Thus, the heat exchanger is de-iced or defrosted. In this sense, heat is transferred to the ambient heat exchanger by means of the refrigerant. The defrosting process thus takes place via a process reversal. In particular, heating processes and defrosting processes alternate cyclically when the heat pump is operated.

Determining the expected start time of the charging process takes into account, in particular, a state of charge of the battery of the motor vehicle and/or a range of the motor vehicle and/or an expected vehicle operating time. For example, the expected vehicle operating time can be determined from user data, such as, for example, data from a navigation system, such as a destination input.

To determine the maximum dew point undershoot, an air mass flow through the ambient heat exchanger is determined in particular. For this purpose, a cooling fan speed of a cooling fan of the motor vehicle and/or a driving speed of the motor vehicle and/or a wind speed can be taken into account. These can be measured by appropriate sensors. Further, a partial pressure difference between the air, in other words, the ambient air, and a surface of the ambient heat exchanger can be determined to determine the maximum dew point undershoot. The maximum frost mass can also be determined in this way. For example, the water mass flow can be calculated as follows.

$$\dot{m}_W = \hat{\beta} \cdot A \cdot \varrho_{in} \cdot (\xi_{H_2O,in} - \xi_{H_2O,\omega})$$

In this case, $\varrho_{in}$ is the density and $\xi_{H_2O,in}$ is the mass fraction of water vapor of the moist air flow at the inlet to the ambient heat exchanger. The mass fraction of water vapor in the saturated state in the immediate vicinity of the wall of the ambient heat exchanger is $\xi_{H_2O,\omega}$. The overflowed heat transfer area is given by A and the mass transfer coefficient due to convective mass transfer is given by $\hat{\beta}$.

If this is desublimated, frost forms on the ambient heat exchanger. The frost mass is the time integral from the beginning of the frosting or icing cycle.

The method can comprise a dynamic adjustment of the maximum dew point undershoot and/or maximum frost mass. If, for example, the outside air is not used as the heat source for the heating mode because, for example, another heat source, for example, the traction components of the motor vehicle, is used, the value of the dew point undershoot and/or the maximum frost mass can be dynamically adjusted. The same can be true in the case where outside air and another heat source, such as, for example, the traction components of the motor vehicle, are used. In other words, a higher dew point undershoot and/or a greater frost mass can be allowed, namely, due to the different use of the other heat source. The thus previously determined maximum dew point undershoot and/or maximum frost mass can thus be adjusted or corrected to the current conditions.

A cooling fan of the motor vehicle can be operated continuously during the charging process at outside temperatures above 0° C. Also, especially at outside temperatures below 0° C., the cooling fan can be operated continuously after the charging process has been completed. This is to ensure the longest possible operating time of the heat pump at the start of travel, because due to the continuous operation of the cooling fan, water can be evaporated from the ambient heat exchanger after the ice or frost has sublimated. Residues of water or ice otherwise lead to a smaller fin cross section, so that the ambient heat exchanger blocks earlier. Depending on the charging time, the cooling fan speed can be adjusted. The charging time can be derived from the state of charge of the battery, for example.

In a further aspect, the invention relates to a heat pump comprising an ambient heat exchanger, a compressor, a heating heat exchanger, and a throttle, and is designed to perform a method as described above. For this purpose, the heat pump can comprise, in particular, an evaluation unit that performs the steps of the method described above and a control unit that transmits corresponding control signals for operating the heat pump.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein.

DETAILED DESCRIPTION

Figure 1:
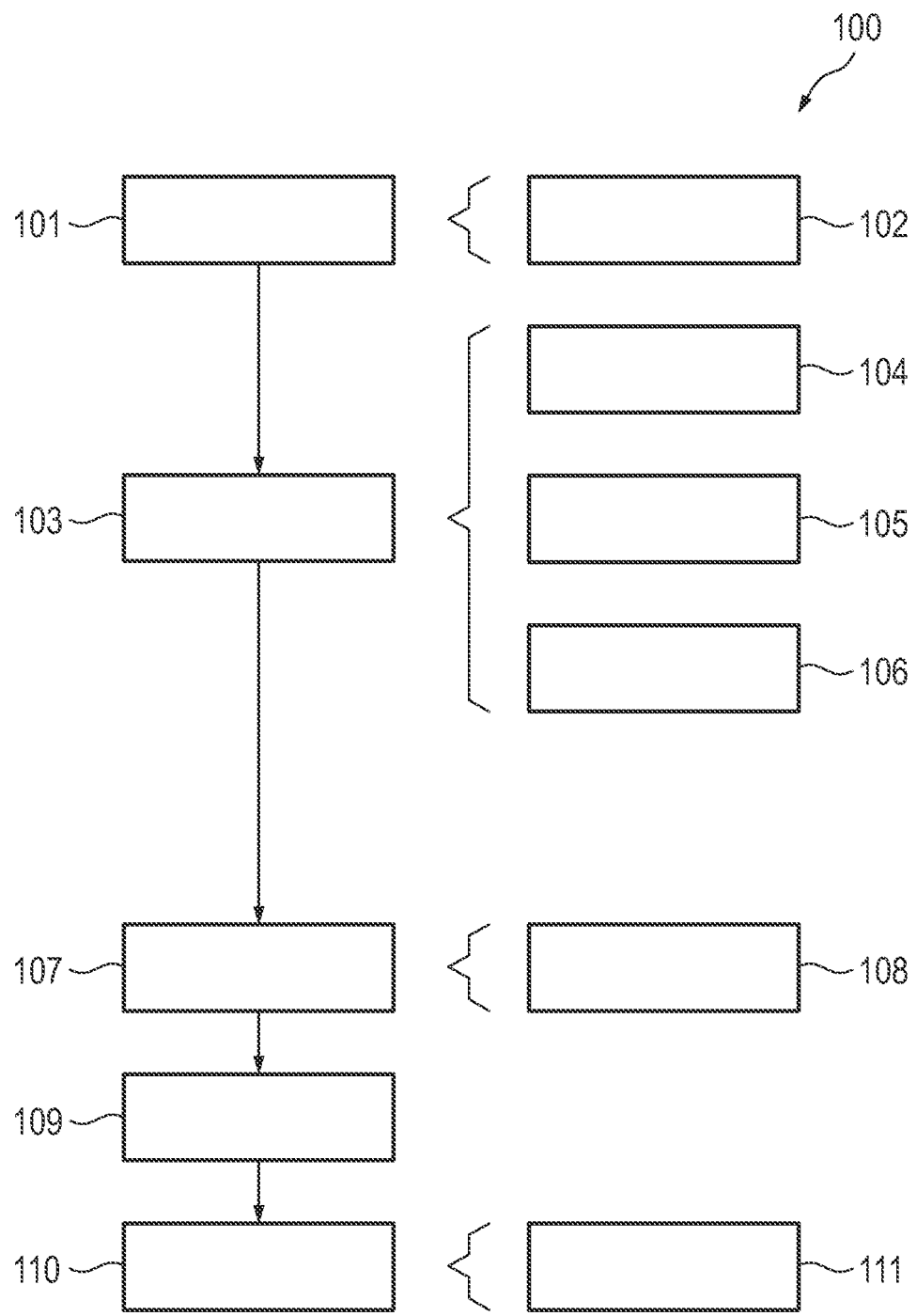
FIG. 1 shows a schematic diagram of a process diagram of a method of the invention.

FIG. 1 shows a process diagram of a method 100 of the invention, which comprises determining 101 an expected start time of a charging process of a motor vehicle battery. Further, a maximum dew point undershoot and/or maximum frost mass are determined 103. Further, the method comprises operating 107 the heat pump such that maximum dew point undershoot and/or maximum frost mass are reached within a predefined time period before the expected start time.

To determine the expected start time of the charging process, a state of charge and/or a range and/or an expected vehicle operating time can be taken into account 102. A partial pressure difference between the air and a surface of the ambient heat exchanger and an air mass flow through the ambient heat exchanger can be determined to determine the maximum dew point undershoot and/or the maximum frost mass 104. For this purpose, a cooling fan speed and/or a driving speed of the motor vehicle and/or a wind speed can be taken into account 105.

A minimum suction pressure of the refrigerant in the refrigerant circuit can be determined on the basis of the determined maximum undershoot of the dew point and/or the maximum frost mass 106.

Figure 2:
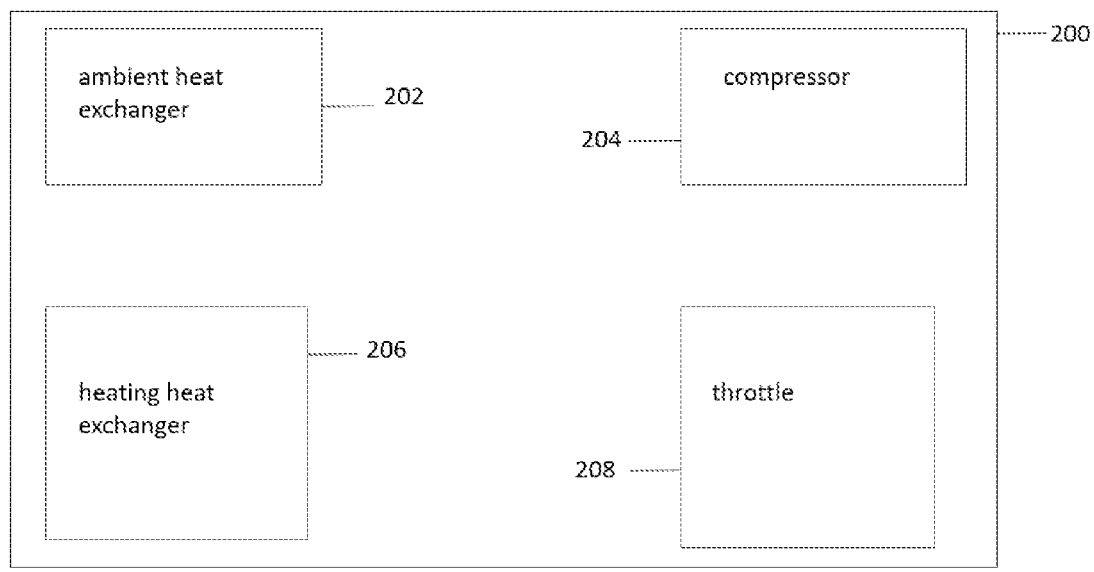
FIG. 2 shows a schematic illustration of a heat pump according to an exemplary aspect of the invention.

FIG. 2 illustrates a heat pump 200. The heat pump 200 includes an ambient heat exchanger 202, a compressor 204, a heating heat exchanger 206 and a throttle 208. To operate the heat pump 200, the compressor 204 and/or the throttle 208 can be controlled accordingly 108. Depending on the specific conditions, for example, the use of a heat source other than outside air when operating in the heating mode, the maximum dew point undershoot and/or maximum frost mass can be dynamically adjusted 109.

The method 100 comprises initiating 110 a defrosting process upon reaching the maximum dew point undershoot and/or the maximum frost mass and/or upon initiating a battery charging process. During the charging process, the cooling fan is operated continuously 111.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a heat pump of a motor vehicle, the heat pump comprising a refrigerant circuit with a refrigerant, the heat pump comprising an ambient heat exchanger, a compressor, a heating heat exchanger, and a throttle, the method comprising:
    determining an expected start time of a charging process of a motor vehicle battery;
    determining a maximum dew point undershoot and/or a maximum frost mass;
    operating the heat pump such that the previously determined maximum dew point undershoot and/or the maximum frost mass are reached within a predefined time period before the expected start time; and
    initiating, a defrosting process, during a battery charging process, upon reaching the maximum dew point undershoot and/or upon reaching the maximum frost mass,
    wherein said determining the expected start time of the charging process takes into account a state of charge of the battery, a range of the motor vehicle and an expected vehicle operating time,
    wherein the defrosting continues until a surface temperature of an ambient heat exchanger of the motor vehicle is above 0° C. to ensure that water drains during the charging period,
    wherein the defrosting continues beyond a time when an ambient heat exchanger of the motor vehicle is free of frost and ice, and
    wherein the maximum dew point undershoot and/or the maximum frost mass are dynamically adjusted.

2. The method according to claim 1, wherein operating the heat pump comprises controlling the compressor and/or the throttle.

3. The method according to claim 1, wherein an air mass flow through the ambient heat exchanger and a partial pressure difference between the air and a surface of the ambient heat exchanger are determined for determining the maximum dew point undershoot and/or the maximum frost mass.

4. The method according to claim 3, wherein a cooling fan speed and/or a driving speed of the motor vehicle and/or wind speed are taken into account for determining the air mass flow.

5. The method according to claim 1, wherein a cooling fan of the motor vehicle is operated continuously during the charging process at outside temperatures above 0° C. or after completion of the charging process.

6. A heat pump for a motor vehicle, wherein the heat pump comprises:
    an ambient heat exchanger;
    a compressor;
    a heating heat exchanger; and
    a throttle,
    wherein the heat pump is configured to perform the method according to claim 1.

7. The method according to claim 1, wherein the heat pump is operated such that the maximum dew point undershoot and the maximum frost mass are reached within a predefined time period before the expected start time.

8. The method according to claim 1, wherein the method further comprises initiating a defrosting process upon reaching the maximum dew point undershoot and upon reaching the maximum frost mass.

9. The method according to claim 3, wherein a cooling fan speed, a driving speed of the motor vehicle and wind speed are taken into account for determining the air mass flow.

10. The method according to claim 1, wherein the maximum frost mass is reached when the maximum frost mass is formed on an ambient heat exchanger of the motor vehicle.

11. The method according to claim 1, wherein the maximum temperature undershoot is a temperature of refrigerant in an ambient heat exchanger of the motor vehicle.

12. The method according to claim 1, further comprising measuring a suction pressure of refrigerant in the refrigerant circuit.

13. The method according to claim 1, further comprising:
    measuring a speed of a cooling fan of the motor vehicle; and
    determining an air mass flow through an ambient heat exchanger of the motor vehicle taking into account the speed of the cooling fan.

14. The method according to claim 1, wherein the suction pressure correlates directly with a temperature in the ambient heat exchanger.

15. A heat pump for a motor vehicle, the heat pump comprising:
- an ambient heat exchanger;
- a compressor;
- a heating heat exchanger; and
- a throttle,
- wherein the compressor and/or the throttle is controlled such that a previously determined maximum dew point undershoot and/or a maximum frost mass are reached within a predefined time period before an expected start time, the maximum dew point undershoot and/or a maximum frost mass being determined by a sensor,
- wherein the heat pump initiates a defrosting process, during a battery charging process, upon reaching the maximum dew point undershoot and/or upon reaching the maximum frost mass,
- wherein the defrosting continues until a surface temperature of an ambient heat exchanger of the motor vehicle is above 0° C. to ensure that water drains during the charging period,
- wherein the defrosting continues beyond a time when an ambient heat exchanger of the motor vehicle is free of frost and ice, and
- wherein the maximum dew point undershoot and/or the maximum frost mass are dynamically adjusted.

16. A method for operating a heat pump of a motor vehicle, the heat pump comprising a refrigerant circuit with a refrigerant, the heat pump comprising an ambient heat exchanger, a compressor, a heating heat exchanger, and a throttle, the method comprising:
- operating the heat pump such that a previously determined maximum dew point undershoot and/or a maximum frost mass are reached within a predefined time period before an expected start time; and
- initiating a defrosting process, during a battery charging process, upon reaching the maximum dew point undershoot and/or upon reaching the maximum frost mass,
- wherein the defrosting continues until a surface temperature of an ambient heat exchanger of the motor vehicle is above 0° C. to ensure that water drains during the charging period,
- wherein the defrosting continues beyond a time when an ambient heat exchanger of the motor vehicle is free of frost and ice, and
- wherein the maximum dew point undershoot and/or the maximum frost mass are dynamically adjusted.

\* \* \* \* \*